United States Patent Office 3,215,698
Patented Nov. 2, 1965

3,215,698
17-HALOYOHIMBANES
John Shavel, Jr., Mendham, Maximilian von Strandtmann, Rockaway Township, and George Bobowski, East Orange, N.J., assignors to Warner-Lambert Pharmaceutical Company, Morris Plains, N.J., a corporation of Delaware
No Drawing. Filed Apr. 1, 1963, Ser. No. 269,791
8 Claims. (Cl. 260—288)

The present invention relates to new and novel 17-haloyohimbanes having the formula:

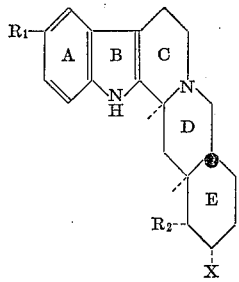

and

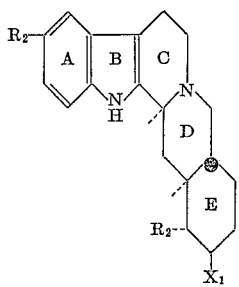

wherein $R_1$ may be hydrogen or

$R_2$ may be hydrogen or lower alkyl such as methyl or ethyl or a chloromethyl group, X is halogen such as chlorine, bromine or fluorine, and $X_1$ may be fluorine or chlorine. This invention also relates to a process for the production of said 17-haloyohimbanes and to new and novel intermediates for their production.

The compounds of this invention are useful as tranquilizers. In addition, they are valuable intermediates in the production of other alkaloids of the yohimbane series.

The compounds of this invention, which bear the A, B, C, D and E rings as depicted in the above structural formulas, are generally 17-halo derivatives of alkaloids of the yohimbane series. Thus, the dotted lines at C/D and D/E ring junctions denote alpha configuration. The $C_{20}$ hydrogen is generally beta-oriented and is indicated by the use of a dot at position 20. The substituents at positions 16 and 17 can also be alpha- or beta-oriented. The use of a dotted line in the above structural formulas denotes alpha-orientation and the use of a solid line, beta-orientation.

The starting materials for the production of the compounds of our invention have the formula:

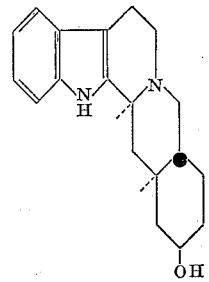

epiyohimbol

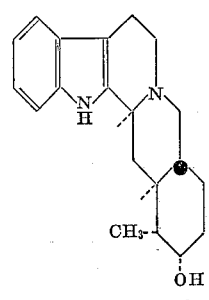

16α-methylyohimbol and

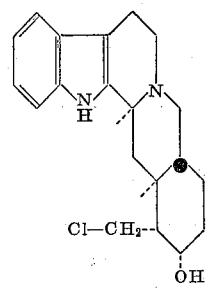

16α-chloromethylyohimbol

The starting materials, epiyohimbol and 16α-methylyohimbol are known compounds described by Karrer et al., Helv. Chim. Acta. 35, p. 6933 (1952) and are derived from the alkaloid yohimbine

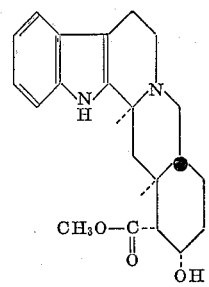

by known procedures.

It has been found that the 17α-haloyohimbane derivatives may be prepared by the following sequence of reactions:

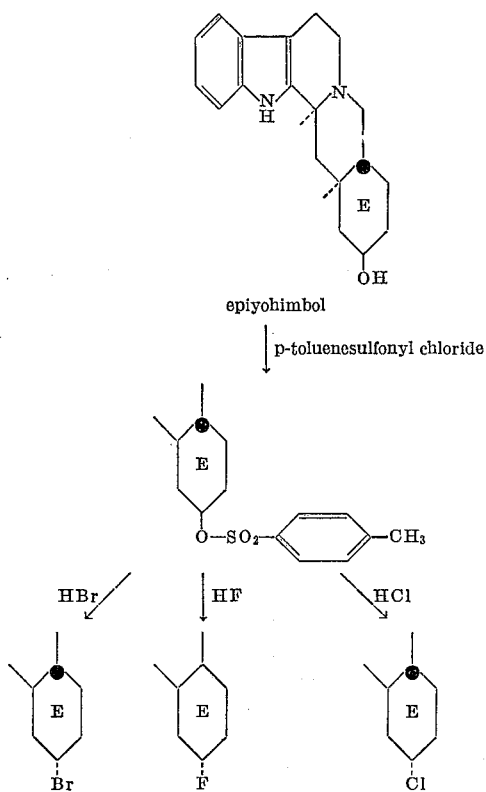

epiyohimbol

The initial step in the production of 17α-haloyohimbane derivatives is the conversion of epiyohimbol to 17β-(p-toluenesulfonyloxy)-yohimbane by reacting with p-toluenesulfonyl chloride. This reaction may be carried out in anhydrous pyridine at a temperature of about 0° to 4° C.

The product obtained is then reacted with the selected hydrogen halide (such as hydrogen bromide or hydrogen fluoride) to obtain the desired 17α-haloyohimbanes. This halogenation reaction is also preferably carried out under anhydrous conditions in a suitable solvent such as pyridine.

An alternate pathway to the preparation of 17α-haloyohimbanes is by the direct action of a phosphorous oxyhalide such as phosphorous oxychloride on epiyohimbol.

The 17α-haloyohimbanes obtained in accordance with the above process are readily converted to 10-acyl substituted 17α-haloyohimbanes by treating the former with an acetylating agent such as acetic anhydride, in the presence of boron-trifluoride.

The present invention, therefore, embraces not only the 17α-haloyohimbanes, but also 10-acyl-substituted derivatives thereof.

It has also been found that the 17β-haloyohimbane derivatives may be produced by the following sequence of reactions employing 16α-methylyohimbol as the starting material and analogous reaction conditions for the production of 17α-haloyohimbanes described above.

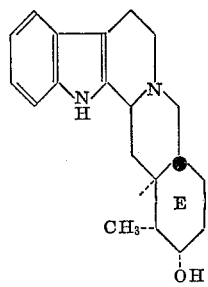

16α-methylyohimbol

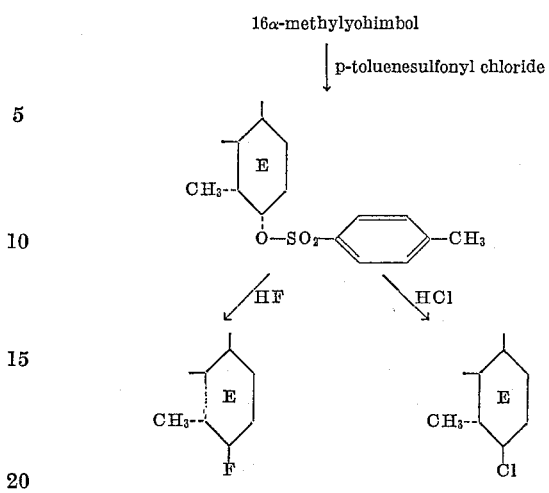

Generally, the desired 17α- and β-halo-substituted yohimbanes, are extracted from the reaction mixture by basifying the latter with ammonia or sodium hydroxide. The precipitate obtained is purified by recrystallization from methanol or ethyl acetate.

The following examples are included further to illustrate the present invention, all temperatures being given in degrees centigrade.

*Example 1.—17β-(toluenesulfonyloxy)-yohimbane*

6.0 g. of p-toluenesulfonyl chloride in 6 ml. of dry pyridine is added dropwise to a solution of 8.0 g. of epiyohimbol in 25 ml. of anhydrous pyridine over a period of 15 minutes with stirring at 0°. The cooling bath is removed, and the solution is allowed to stand for four hours at 20 to 25° C. 200 ml. of ether are then added with stirring and the resulting precipitate is filtered off, made basic with ammonia, taken up with 150 ml. of chloroform and the two phases separated. The aqueous layer is extracted with 75 ml. of chloroform. The combined extracts are dried over anhydrous sodium sulfate and the solvent is removed in vacuo. Trituration with 15 ml. of hot tetrahydrofuran-methanol (2:1) and recrystallization from methanol-tetrahydrofuran (1:1) gives 17β-(p-toluenesulfonyloxy)-yohimbane, M.P. 285–293°, yield: 4 g., $[\alpha]_D^{25}=+5°$, c.=0.46, chloroform; $[\alpha]_D^{25}=-17°$, c.=0.69, pyridine.

Anal. for $C_{26}H_{30}N_2O_3S$.—Calcd.: C, 69.30; H, 6.71; N, 6.22; S, 7.12. Found: C, 69.07; H, 6.62; N, 6.23; S, 7.04, 6.84.

Infrared spectra, $\nu_{max}^{Nujol}$: 3470 (s.), 1599, 1345 (v.s.), 1173 (v.s.), 955 (w.) 918 (v.s.), 871 (v.s.), 839 (m.), 816 (m.), 663 (m.) 3m.$^{-1}$. U. V. spectra, $\lambda_{max}^{EtOH}$: 225 mμ (ε=7,350), λ shoulder: 289 mμ (ε=47,000), 276 mμ (ε=7,350); λ shoulder: 289 mμ(ε=6,050); λ min.: 2455 mμ (ε=2,350).

*Example 2.—17α-fluoroyohimbane*

To a solution of 3.0 g. of 17β-(p-toluenesulfonyloxy)-yohimbane in 25 ml. of dry pyridine, in a polyethylene container, protected from moisture, is added 25 ml. of hydrogen fluoride while keeping the temperature at 20° and the reaction is allowed to proceed at 20° to 25° for about eight days. The contents are poured onto 400 g. of crushed ice and made basic with ammonia. The solid which precipitates is filtered off and taken up with 200 ml. of methylene chloride. The solution is treated with charcoal, dried, and the solvent removed in vacuo. Trituration of the brown-greenish, solid residue with 15 ml. of hot methanol and recrystallization from methanol gives 17α-fluoroyohimbane in the form of white crystals, M.P. 203–220°, $[\alpha]_D^{25}=-91$, c.=0.82, chloroform; $[\alpha]_D^{25}=-108$, c.=0.9, pyridine.

Anal. for: $C_{19}H_{23}N_2F$.—Calcd.: C, 76.47; H, 7.77; N, 9.39; F, 6.37. Found: C, 76.95, 76, 67; H, 7.60, 7.85; N, 9.44; F, 6.30, 6.40.

Infrared spectra, $\nu_{max.}^{Nujol}$: 1263 (m.), 1119 (v.s.), 961 (v.s.), 897 (v.s.), 835 (s.) cm$^{-1}$. U.V. spectra, $\lambda_{max.}^{EtOH}$: 225 m$\mu$ ($\epsilon=34,500$), 280 m$\mu$ ($\epsilon=6,800$); $\lambda_{Shoulder}^{EtOH}$: 288 m$\mu$ ($\epsilon=5,750$); $\lambda$ min.: 245 m$\mu$ ($\epsilon=1,600$).

*Example 3.—17α-bromoyohimbane*

To a stirred solution of 8.0 g. of 17β-(p-toluenesulfonyloxy)-yohimbane in 150 ml. of anhydrous pyridine, protected from moisture and heated on a steam bath at 75° (internal temperature) gaseous hydrogen bromide is introduced over a period of forty minutes. The heating is continued for five hours at 85°. After the reaction mixture is cooled to 5°, it is then poured onto 2 liters of ice-water, made basic with ammonia, and the tan-brown colored precipitate is filtered off and re-dissolved in chloroform. The chloroform solution is dried over anhydrous sodium sulfate, and the solvent is removed in vacuo. Trituration of the brown residue with 20 ml. of hot methanol yields 2.0 g. of 17α-bromoyohimbane. Recrystallization from methanol and methanol-acetone (1:1) gives white crystals, M.P. 292–297°, $[\alpha]_D^{25}=-56$, c.=0.6, chloroform; $[\alpha]_D^{25}=-83$, c.=0.8, pyridine.

Anal. for: C$_{19}$H$_{23}$N$_2$Br:—Calcd.: C, 63.51; H, 6.45; N, 7.80; Br, 22.24. Found: C, 63.73; H, 6.50; N, 7.63; Br, 22.24.

Infrared spectra, $\nu_{max.}^{Nujol}$: 1261 (m.), 1224 (m.), 1171 (m.) 797 (w.), 708 (s.) cm.$^{-1}$. U.V. spectra, $\lambda_{max.}^{EtOH}$: 225 m$\mu$ ($\epsilon=37,600$), 280 m$\mu$ ($\epsilon=7,250$); $\lambda$ shoulder: 287 m$\mu$ ($\epsilon=6,100$); $\lambda$ min.: 246 m$\mu$ ($\epsilon=1,900$).

*Example 4.—17α-chloroyohimbane*

*Method A.*—Gaseous hydrogen chloride is bubbled through a heated solution (about 70° C.) of 0.8 g. of 17β-(p-toluenesulfonyloxy) yohimbane in 20 ml. of anhydrous pyridine over a period of 15 minutes. After heating for an additional half hour, the hot solution is poured onto 120 g. of crushed ice, made basic by ammonia and filtered. The tan-colored solid is redissolved in methylene chloride, dried over sodium sulfate, and the solvent removed in vacuo. Crystallization of the brown residue from methanol gives 0.45 g. of 17α-chloroyohimbane in the form of tan-colored needles, M.P. 195–198° (the melted product resolidifies at 215°, and remelts at 300–304°), $[\alpha]_D^{25}=-42.6$, c.=0.75, chloroform; $[\alpha]_D^{25}=-49$, c.=0.865, pyridine.

Anal. for: C$_{19}$H$_{23}$N$_2$Cl.—Calcd.: C, 72.48; H, 7.36; N, 8.90; Cl, 11.26. Found: C, 72.55; H, 7.49; N, 9.10; Cl, 11.09, 10.97.

Infrared spectra, $\nu_{max.}^{Nujol}$: 1253 (m.), 729 (v.s.), 717 (s.) cm.$^{-1}$. U.V. spectra, $\lambda_{max.}^{EtOH}$: 225.5 m$\mu$ ($\epsilon=38,750$), 282 m$\mu$ ($\epsilon=7,650$); $\lambda$ shoulder: 288 m$\mu$ ($\epsilon=6,400$); $\lambda$ min.: 246 m$\mu$ ($\epsilon=2,400$).

*Method B.*—A solution of 4.2 g. of p-toluenesulfonyl chloride in 15 ml. of dry pyridine is added with stirring at 0° to a solution of 6.0 g. of epiyohimbol in 25 ml. of pyridine over a period of 30 minutes and is allowed to stand at 20 to 25° C. for one half hour. The mixture is then heated on a steam bath about 70 to 80° (CaCl$_2$ tube), and gaseous hydrogen chloride is bubbled in for 20 minutes. After the heating for an additional five hours, the brown-black solution is poured onto 300 g. of crushed ice and the resulting precipitate is filtered off. The collected dark residue is stirred with 25 ml. of 5% aqueous sodium hydroxide in 150 ml. of chloroform, and the two phases are separated. The chloroform extract is dried over anhydrous sodium sulfate, and the solvent is removed in vacuo. Trituration of the brown-black residue with 10 ml. of methanol gives 2.9 g. of 17α-chloroyohimbane. The product is further purified by dissolving in acetone-methanol (2:1), treatment with charcoal, and concentration to a low volume to give white needles, M.P. 195 to 200° (resolidifies at 220°, remelts at 295 to 303°), $[\alpha]_D^{25}$ =—40, c.=0.7, chloroform; $[\alpha]_D^{25}=-48$, c.=0.45, pyridine.

*Example 4*

*Method C.*—To a chilled solution of 4 g. epiyohimbol in 20 ml. dry pyridine is added with stirring and under protection from moisture a solution of 7 ml. POCl$_3$ in 20 ml. pyridine. After heating on a steam bath at about 75 to 80° for 90 minutes, the black reaction mixture is poured into 300 ml. ether. The oily precipitate is triturated with two 100 ml. portions of ether and dissolved in 300 ml. water. The solution is basified with ammonia. The precipitated product is dissolved in the minimum amount of acetic acid and the resulting solution is diluted with 600 ml. water. After adjusting the pH to 5 by addition of ammonia, the mixture is filtered over supercel. The filtrate is basified with ammonia and the resulting precipitate dried and dissolved in acetone. This solution is decolorized with charcoal and concentrated in vacuo to give 17α-chloroyohimbane in the form of crystals melting at 178 to 185°; $[\alpha]_D^{25}=-51$, c.=0.8, pyridine.

Anal. for: C$_{19}$H$_{23}$N$_2$Cl.—Calcd.: C, 72.48; H, 7.36; N, 8.90; Cl, 11.26. Found: C, 72.53; H, 7.50; N, 8.95; Cl, 11.27.

*Example 5.—10-acetyl-17α-chloroyohimbane*

*Method A.*—A solution of 3.0 g. of 17α-chloroyohimbane in 10 ml. of glacial acetic acid and 60 ml. of acetic anhydride is added dropwise with stirring at —10° to a mixture of 10 ml. of glacial acetic acid and 100 ml. of acetic anhydride, saturated previously at —10° with boron-trifluoride gas. After the stirring is continued for four hours at —15° to —5°, the contents are poured onto 500 g. of crushed ice, made basic by ammonia, and extracted twice with 150 ml. of chloroform. The extracts are dried over sodium sulfate, and the solvent is removed in vacuo. The brown semi-solid residue is chromatographed on 120 g. of florisil (8 fractions, 50 ml. each), using methylene chloride and, finally, methanol as eluents. The combined eluates of fractions 3–8 are evaporated to dryness under reduced pressure, and the residue is recrystallized from acetonitrile to give 1.4 g. of 10-acetyl-17α-chloroyohimbane in the form of white crystals, M.P. 220 to 225°, $[\alpha]_D^{25}=-36$, c.=0.595, chloroform; $[\alpha]_D^{25}=-18$, c.=0.8, pyridine.

Anal. for: C$_{21}$H$_{25}$N$_2$OCl.—Calcd.: C, 70.67; H, 7.06; N, 7.85; Cl, 9.94. Found: C, 70.68; H, 7.20; N, 7.59; Cl, 10.18, 10.08.

Infrared spectra, $\nu_{max.}^{Nujol}$: 1671 (v.s.), 1623 (s.), 1583 (s.) 1570 (s.), 1329 (s.), 1301 (s.), 1269 (s.), 1128 (m.) 946 (s.), 875 (s.), 814 (v.s.), 721 (m.), 705 (w.). U.V. spectras, $\lambda_{max.}^{EtOH}$: 257 m$\mu$ ($\epsilon=41,000$), 288 m$\mu$ ($\epsilon=8,500$); $\lambda$ min.: 225 m$\mu$ ($\epsilon=4,250$), 276 m$\mu$ ($\epsilon=7,000$).

*Example 6.—16α-methyl-17α-(p-toluenesulfonyloxy)-yohimbane*

To a solution of 9.3 g. 16α-methylyohimbol in 50 ml. dry pyridine is added with stirring a solution of 18.6 g. p-toluenesulfonylchloride in 20 ml. pyridine. The reaction mixture is stirred for half an hour, allowed to stand 16 to 18 hours at 20 to 25° C. and poured into 250 ml. ice-cold 1% sodium hydroxide. The precipitate is filtered off, washed with water, suspended in ca. 200 ml. 5% ammonia and 200 ml. chloroform and stirred for one hour. The solids are collected on filter, dried in a vacuum desiccator and recrystallized from acetonitrile, giving 16α - methyl - 17α(p - toluenesulfonyloxy)yohimbane, M.P. 290 to 295°; $[\alpha]_D^{25}=-50°$, c.=0.7, pyridine.

Anal. for: C$_{27}$H$_{32}$N$_2$O$_3$S·½H$_2$O.—Calcd.: C, 68.46; H, 7.02; N, 5.92; S, 6.77. Found: C, 68.36; H, 6.82; N, 5.65; S, 6.48.

Infrared spectra, $\nu_{max.}^{Nujol}$: 675, 740, 1010, 1030, 1120, 1170, 3250 cm.$^{-1}$. U.V. spectra, $\lambda_{max.}^{EtOH}$: 225.5 ($\epsilon=45,000$), 282 ($\epsilon=7,000$); $\lambda$ shoulder: 290 ($\epsilon=6,000$) m$\mu$.

Example 7.—17β-chloro-16α-methylyohimbane

Into a solution of 3 g. 16α-methylyohimbol(p-toluenesulfonyloxy)yohimbane in 20 ml. dry pyridine a stream of dry hydrogen chloride is introduced without cooling and under the protection from moisture. The reaction mixture is then heated to about 80° on a steam bath for about four hours, allowed to cool, poured into 600 ml. ice-water and basified with 2% sodium hydroxide to give 17β-chloro-16α-methylyohimbane as a precipitate which is collected on filter and dried in a vacuum desiccator over sulfuric acid. Yield: 1.4 g. A twofold recrystallization from 05% ethanolic ethyl acetate gives analytically pure 17β - chloro - 16α - methylyohimbane. M.P. 310 to 313°; $[\alpha]_D^{25} = -188$, c.=0.5, pyridine.

Anal. for $C_{20}H_{25}N_2Cl$.—Calcd.: C, 73.04; H, 7.66; N, 8.52; Cl, 10.78. Found: C, 73.05; H, 7.81; N, 8.59; Cl, 10.93.

Infrared spectra, $\nu_{max}^{Nujol}$: 750, 815, 2400 cm.$^{-1}$. U.V. spectra, $\lambda_{max}^{EtOH}$: 225.5 ($\epsilon$=36,000), 282 ($\epsilon$=7,000); λ shoulder: 290 mμ.

Example 8.—17β-fluoro-16α-methylyohimbane

Into a solution of 3 g. 16α-methylyohimbol(p-toluenesulfonyloxy)yohimbane in 40 ml. pyridine, under external cooling and under protection from moisture, is introduced anhydrous hydrogen fluoride until the volume is doubled. The reaction mixture is heated at 60 to 70° for four hours, allowed to stand for about 48 to 60 hours, poured with stirring onto 600 ml. crushed ice and basified with 10% sodium hydroxide. The precipitate is collected on filter, washed with water and extracted with five 100 ml. portions of chloroform. The combined chloroform extracts are dried over sodium sulfate, filtered through supercel and evaporated to dryness to give 17β-fluoro-16α-methylyohimbane as a residue which after recrystallized from ethanol-ethyl acetate melts at 195 to 200°; $[\alpha]_D^{25} = -145$, c.=0.3.

Anal. for $C_{20}H_{25}N_2F$.—Calcd.: N, 8.97. Found: N, 8.73.

Example 9.—16α-(chloromethyl)-17β-chloroyohimbane 20 ml. phosphorous oxychloride are added dropwise with stirring to a solution of 6.0 g. of 16α-(chloromethyl)-17α-hydroxyyohimbane in 50 ml. of dry pyridine over a period of 40 minutes at 0°. After standing at 20 to 25° C. for three hours, the reaction mixture is heated at 65 to 75° for three hours, cooled to 5°, and poured onto 500 g. of ice-water. The solid which precipitates is filtered off, stirred with 10 ml. of 10% aqueous sodium hydroxide and 150 ml. of chloroform. The chloroform extract is dried over anhydrous sodium sulfate, and the solvent removed in vacuo. Trituration of the black residue with 15 ml. of hot methanol, decolorization with charcoal, and recrystallization from methanol-acetone gives 0.45 g. of 16α-(chloromethyl)-17β-chloroyohimbane in the form of white, shiny needles, M.P. 259 to 263°, $[\alpha]_D^{25} = +11$, c.=0.60, chloroform.

Anal. for $C_{20}H_{24}N_2Cl_2$.—Calcd.: C, 66.11; H, 6.66; N, 7.71; Cl, 19.52: Found: C, 65.82; H, 6.92; N, 7.80; Cl, 19.67, 19.37.

Infrared spectra, $\nu_{max}^{Nujol}$: 1335 (w.), 1285 (w.), 1100 (w.). U.V. spectra, $\lambda_{max}^{EtOH}$: 225 mμ ($\epsilon$=31,850), 280 mμ ($\epsilon$=6,750); λ shoulder: 289 ($\epsilon$=5,900); λ min.: 246 ($\epsilon$=2,600).

It is to be understood that the foregoing detailed description is given merely by way of illustration and that many variations may be made therein without departing from the spirit of our invention.

Having described our invention, what we desire to secure by Letters Patent is:

1. A compound selected from the group consisting of those having the formula:

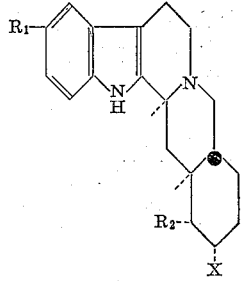

and

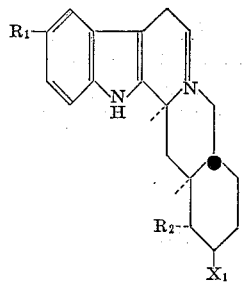

wherein $R_1$ is a member of the group consisting of hydrogen and

$R_2$ is a member of the group consisting of hydrogen, lower alkyl and chloromethyl, X is halogen and $X_1$ is a member of the group consisting of chlorine and fluorine.

2. 17α-fluoroyohimbane.
3. 17α-bromoyohimbane.
4. 17α-chloroyohimbane.
5. 10-acetyl-17α-chloroyohimbane.
6. 17β-chloro-16α-methylyohimbane.
7. 17β-fluoro-16α-methylyohimbane.
8. 16α-chloromethyl-17β-chloroyohimbane.

References Cited by the Examiner

UNITED STATES PATENTS 3,046,279  6/62  Shavel et al. _____ 260—287

FOREIGN PATENTS 222,546  7/59  Australia.

OTHER REFERENCES

Ban et al.: Tetrahedron Letters, No. 5 (Apr. 1962) pages 181–4.

MacPhillamy et al.: Jour. Amer. Chem. Soc., vol. 77 (1955), pages 4335–4337 and 4340.

Robison et al.: Jour. Amer. Chem. Soc., vol. 83 (June 20, 1961), pages 2694, 2696, 2699.

WALTER A. MODANCE, *Primary Examiner.*

NICHOLAS S. RIZZO, *Examiner.*